United States Patent
Lee et al.

(10) Patent No.: US 9,491,005 B2
(45) Date of Patent: Nov. 8, 2016

(54) NETWORK SYSTEM AND METHOD OF CONTROLLING NETWORK SYSTEM

(75) Inventors: Koonseok Lee, Seoul (KR); Hoonbong Lee, Seoul (KR); Yanghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 473 days.

(21) Appl. No.: 13/512,195

(22) PCT Filed: Nov. 26, 2010

(86) PCT No.: PCT/KR2010/008435
§ 371 (c)(1),
(2), (4) Date: May 25, 2012

(87) PCT Pub. No.: WO2011/065775
PCT Pub. Date: Jun. 3, 2011

(65) Prior Publication Data
US 2012/0290142 A1   Nov. 15, 2012

(30) Foreign Application Priority Data

Nov. 26, 2009  (KR) .................. 10-2009-0115203
Dec. 17, 2009  (KR) .................. 10-2009-0126364

(51) Int. Cl.
*G05D 17/00* (2006.01)
*G01R 21/00* (2006.01)
(Continued)

(52) U.S. Cl.
CPC .................... *H04L 12/66* (2013.01)

(58) Field of Classification Search
CPC ........................................ H04L 12/66
USPC .............. 700/291, 297; 702/60–63
See application file for complete search history.

(56) References Cited

U.S. PATENT DOCUMENTS

| 5,924,486 A | 7/1999 | Ehlers et al. |
| 6,204,837 B1 * | 3/2001 | Smith .......................... 345/157 |

(Continued)

FOREIGN PATENT DOCUMENTS

| JP | 11295358 A | 10/1999 |
| JP | 2004060998 A | 2/2004 |
| KR | 1020040006795 A | 1/2004 |

OTHER PUBLICATIONS

Balaras et al., "European Residentialo Buildings and Empirical Assessment of the Hellenic Building Stock, Energy Consumption, Emission and Potential Energy Saving", Elsevier, 2007,pp. 1298-1314.*

(Continued)

*Primary Examiner* — Robert Fennema
*Assistant Examiner* — Thomas Stevens
(74) *Attorney, Agent, or Firm* — Dentons US LLP

(57) ABSTRACT

Provided are a network system and a method of controlling the same. The network system includes a metering device metering energy supplied from a power supply source, a communication device by which energy information related to the energy communicates, an energy management device recognizing the energy information to control an operation of an electric product, and an environment information management device recognizing a carbon amount or a carbon dioxide amount, which is generated according to the operation of the electric product. A power-saving operation of the electric product is selectively performed, based on the carbon amount or the carbon dioxide amount recognized by the environment information management device. Since a power management program is executed using an environment information management unit, energy may be further efficiently managed within an intellectual power supply network.

11 Claims, 14 Drawing Sheets

(51) Int. Cl.
*G01R 31/36* (2006.01)
*H04L 12/66* (2006.01)

(56) References Cited

U.S. PATENT DOCUMENTS

| | | | |
|---|---|---|---|
| 6,208,341 B1* | 3/2001 | van Ee et al. | 715/716 |
| 6,466,228 B1* | 10/2002 | Ulrich et al. | 345/619 |
| 6,633,823 B2* | 10/2003 | Bartone et al. | 702/57 |
| 8,121,737 B2* | 2/2012 | West et al. | 700/286 |
| 8,554,384 B2* | 10/2013 | West et al. | 700/291 |
| 2002/0062594 A1* | 5/2002 | Erickson | 47/48.5 |
| 2003/0088370 A1* | 5/2003 | Bagepalli et al. | 702/32 |
| 2003/0168864 A1* | 9/2003 | Heronemus et al. | 290/55 |
| 2003/0178894 A1 | 9/2003 | Ghent | |
| 2003/0207655 A1* | 11/2003 | Jackson | 451/38 |
| 2004/0098169 A1* | 5/2004 | Abe et al. | 700/286 |
| 2004/0138981 A1 | 7/2004 | Ehlers et al. | |
| 2007/0048181 A1* | 3/2007 | Chang et al. | 422/57 |
| 2008/0052145 A1* | 2/2008 | Kaplan et al. | 705/8 |
| 2008/0165140 A1* | 7/2008 | Christie et al. | 345/173 |
| 2009/0018884 A1* | 1/2009 | McConnell et al. | 705/7 |
| 2009/0062970 A1* | 3/2009 | Forbes et al. | 700/295 |
| 2009/0063228 A1* | 3/2009 | Forbes, Jr. | 705/7 |
| 2009/0088907 A1 | 4/2009 | Lewis et al. | |
| 2009/0088991 A1 | 4/2009 | Brzezowski et al. | |
| 2009/0089152 A1* | 4/2009 | Davis et al. | 705/10 |
| 2009/0125436 A1* | 5/2009 | Palanchian et al. | 705/37 |
| 2009/0271329 A1* | 10/2009 | Mohri | 705/36 R |
| 2010/0004791 A1* | 1/2010 | West et al. | 700/291 |
| 2010/0179670 A1* | 7/2010 | Forbes et al. | 700/22 |
| 2010/0228601 A1* | 9/2010 | Vaswani | G06Q 10/06 705/308 |
| 2010/0235008 A1* | 9/2010 | Forbes et al. | 700/291 |
| 2010/0332373 A1* | 12/2010 | Crabtree et al. | 705/37 |
| 2011/0004350 A1* | 1/2011 | Cheifetz | F24F 11/0009 700/276 |
| 2011/0014867 A1* | 1/2011 | Chen | 455/41.2 |
| 2011/0015797 A1* | 1/2011 | Gilstrap | 700/291 |
| 2011/0029655 A1* | 2/2011 | Forbes, Jr. | G06Q 10/00 709/223 |
| 2011/0035073 A1* | 2/2011 | Ozog | 700/291 |
| 2011/0172841 A1* | 7/2011 | Forbes, Jr. | 700/292 |
| 2012/0026726 A1* | 2/2012 | Recker et al. | 362/157 |
| 2012/0130557 A1* | 5/2012 | West et al. | 700/291 |

OTHER PUBLICATIONS

Firth el al., "Identifying Trends in the use of Domestic Appliances from Household Electricity Consumption Measurements", Elsevier, 2008, pp. 926-936.*

In Ru, "Home Network Road to Ubiquitous World", Power Point Presentation, 2006, 18 pages.*

* cited by examiner

NETWORK SYSTEM AND METHOD OF CONTROLLING NETWORK SYSTEM

This application claims the benefit of priority of PCT Application No. PCT/KR2010/008435 filed on Nov. 26, 2010 which claims the benefit of priority of Korean Application No. 10-2009-0115203 filed on Nov. 26, 2009 and Korean Application No. 10-2009-0126364 filed on Dec. 17, 2009, all of which are incorporated by reference in their entirety herein.

TECHNICAL FIELD

The present disclosure relates to a network system and a method of controlling the network system.

BACKGROUND ART

In general, power for operating electric products such as electric home appliances or office equipment is supplied through a power plant, a power transmission line, and a power distribution line.

Such power is supplied from a central power source, not a distributed power source, so that the power spreads in a radial shape from the center to the periphery, which is supplier-centered rather than consumer-centered.

In addition, the supplying of the power is analog and electromechanical, and damage due to an accident is manually undone, and related facilities are manually recovered.

The information about electricity charge can be known only through a power exchange, and thus, it is difficult to know the information about electricity charge in real time. In addition, since a pricing system is substantially fixed, it is difficult to provide incentives for consumers by using price variations.

To address these limitations and improve the efficiency of energy, researches are being actively carried out on a power network, which can realize a flexible power control. The power control may include a consumption reaction control or an intellectual power control.

As described above, the current power network is vertical and centralized network that is controlled by a supplier, but the consumption reaction control or the intellectual power control is a horizontal, cooperative, and distributed network that is distributed from a supplier and allows the interaction between suppliers and consumers.

When the flexible power control is realized, for power consumers such as a house or a building, it is needed that a separate electric product and a network connected to a plurality of electric products communicate with a power supply source through a two-way communication for power information, instead of just receiving power. Also, devices for the two-way communication are needed.

DISCLOSURE OF INVENTION

Technical Problem

Embodiments provide a method of more efficiently managing power within an intellectual power supply network.

Embodiments also provide an electric product, which performs a power management program using an environment information management unit.

Embodiments also provide a network system in which a communication modem detachably disposed on an electric product manages power information or manages and processes environment information to reduce an electricity charge or a carbon dioxide emission amount.

Embodiments also provide a network system in which a communication modem is easily detached to an electric product to allow the corresponding electric product to be easily participated in a power management program related to a power management network.

Solution To Problem

In one embodiment, a network system includes: a metering device metering energy supplied from a power supply source; a communication device by which energy information related to the energy communicates; an energy management device recognizing the energy information to control an operation of an electric product; and an environment information management device recognizing a carbon amount or a carbon dioxide amount, which is generated according to the operation of the electric product, wherein a power-saving operation of the electric product is selectively performed, based on the carbon amount or the carbon dioxide amount recognized by the environment information management device.

In another embodiment, a method of controlling a network system including a communication device by which energy information related to energy supplied from a power supply source communicates and an energy management device controlling an operation of an electric product based on the energy information includes: recognizing a carbon dioxide emission amount generated or estimated corresponding to one operation mode of the electric product; and performing an operation for reducing power consumption of the electric product, based on a result obtained by comparing the estimated carbon dioxide emission amount to a preset target value of a carbon dioxide emission amount.

Advantageous Effects of Invention

According to the present disclosure, since the power management program is executed using the environment information management unit, the energy may be further efficiently managed within the intellectual power supply network.

Also, since the users select the power supply source according to the real-time power information, the electricity costs may be minimized and the energy efficiency may be improved.

Also, since the operation mode of the electric appliance is selected, the power consumption may be further efficiently managed.

Also, since the power consumption pattern is estimated for a predetermined period and the power is used based on the estimated information, the energy may be further efficiently managed. Also, since the power consumption information is continuously accumulated in the data storage, accuracy of the estimated power consumption may be improved, thereby efficiently managing the power consumption.

Also, since the user recommends the power-saving operation mode provided from the power information management unit or the environment information management unit of the communication modem instead of the randomly inputted operation mode, user's convenience may be improved.

Also, when the user selects the power-saving operation mode or the electric product is operated according to the target value of the electricity charge, the power consumption, or the carbon dioxide emission amount, the saved electricity charge and power consumption or the reduced carbon dioxide emission amount may be clearly informed to the user.

Thus, there is an advantageous that the user may certainly recognize economical profit and positive environmental inference due to the power-saving operation mode.

MODE FOR THE INVENTION

Figure 1:
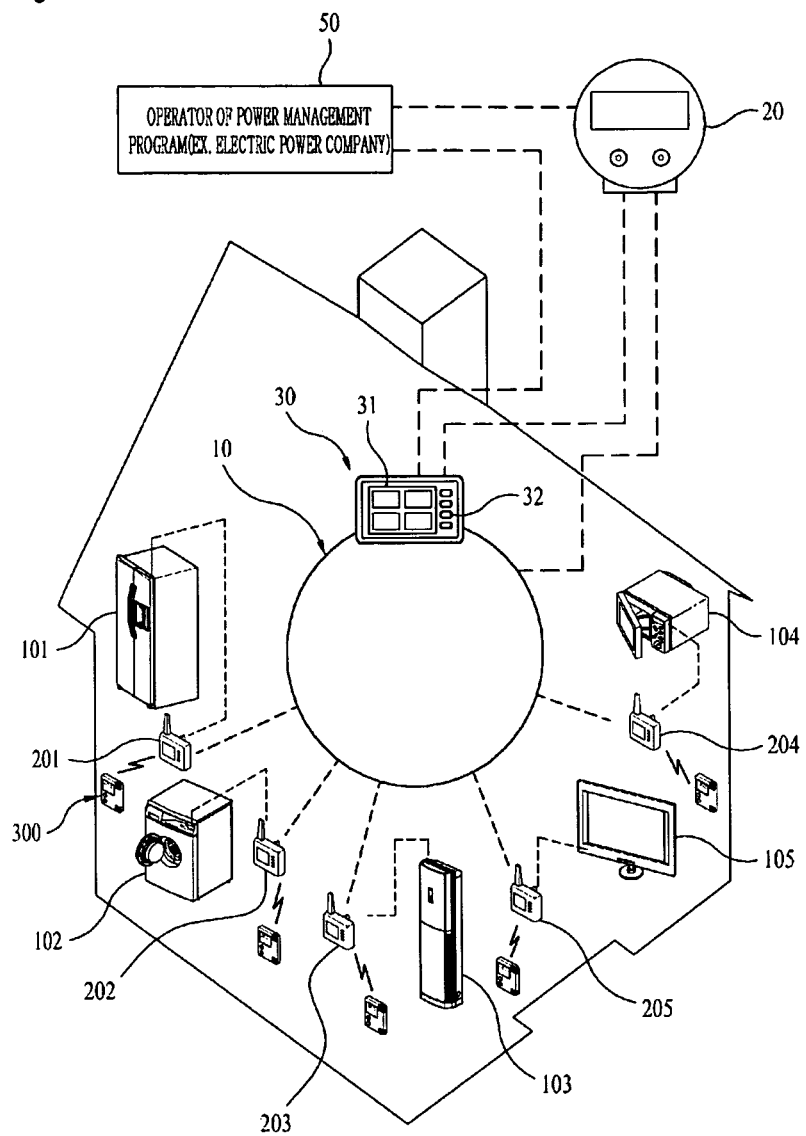
FIG. 1 is a schematic view of a power management network according to an embodiment.

Reference will now be made in detail to the embodiments of the present disclosure, examples of which are illustrated in the accompanying drawings. The invention may, however, should not be construed as being limited to the embodiments set forth herein; rather, that alternate embodiments included in other retrogressive inventions or falling within the spirit and scope of the present disclosure will fully convey the concept of the invention to those skilled in the art.

All terms used herein have the same meanings as general terms understood by those of ordinary skill in the art. If the terms used herein collide with the general terms, the terms used herein take priority over the general terms. While the present disclosure has been particularly shown and described with reference to exemplary embodiments thereof, it will be understood by those of ordinary skill in the art that various changes in form and details may be made therein without departing from the spirit and scope of the present disclosure as defined by the following claims. Like reference numerals refer to like elements throughout.

FIG. 1 is a schematic view of a power management network 10 according to an embodiment.

The power management network includes a metering device (smart meter) 20 which can measure power supplied to a residential customer and the electricity charge of the power in real time and an energy management system (EMS) 30 connected to the metering device (smart meter) 20 and a plurality of electric products such as home appliances for controlling the electric products.

Here, the electricity charge is measured based on price for each time. The price for each time is expensive in a time period where power consumption increases steeply and inexpensive in a time period such as midnight where a relatively small amount of power is consumed.

The power management network 10 is operated by a power management program made to efficiently mange electricity charges and power consumption in the residential customer according to time-varying electricity costs.

For executing the power management program, the EMS 30 and the metering device (smart meter) 20 communicates with an operator 50 of the power management program, such as an electric power company.

Here, the EMS 30 may be provided in the form of a terminal, which includes a screen 31 to display the current power consumption state and external environments (temperature, humidity) and an input unit 32 to receive user' manipulations.

The EMS 30 and the metering device (smart meter) 20 are selectively or simultaneously connected to the electric products such as a refrigerator 101, a washing or drying machine 102, an air conditioner 103, a TV 105, and a cooking device 104 through an in-house power management network.

Communication modems 200 (201 to 205) are detachably provided to the electric products as a communication device for wireless communication with the EMS 30 and the metering device (smart meter) 20. The communication modems 200 may be coupled to the outsides of the electric products for each attachment and detachment. Also, for the detachment of the communication modem 200, a slot or port may be provided in each of the electric products.

The communication modems 200 are operated according to ZigBee (wireless communication method) for communications such as one-to-one, one-to-many, and many-to-many communications. However, the communication method of the communication modems 200 is not limited to ZigBee. Other wireless communication methods may be used.

Therefore, power information or operation information of the electric products connected to the communication modems 200 may be transmitted to the EMS 30 or the metering device (smart meter) 20 through the communication modems 200, and the information may be transmitted in the opposite direction.

The network system further includes a power management network binder (hereinafter, referred to as a "binder") to register the communication modem 200 in the power management network 10.

When an input unit is manipulated to register the communication modem 200 after the binder 300 is disposed around the communication modem 200, the binder 300 grants a home code and a product code to the communication modem 200. In this process, the communication modem 200 may be registered in the power management network 10.

Figure 2:
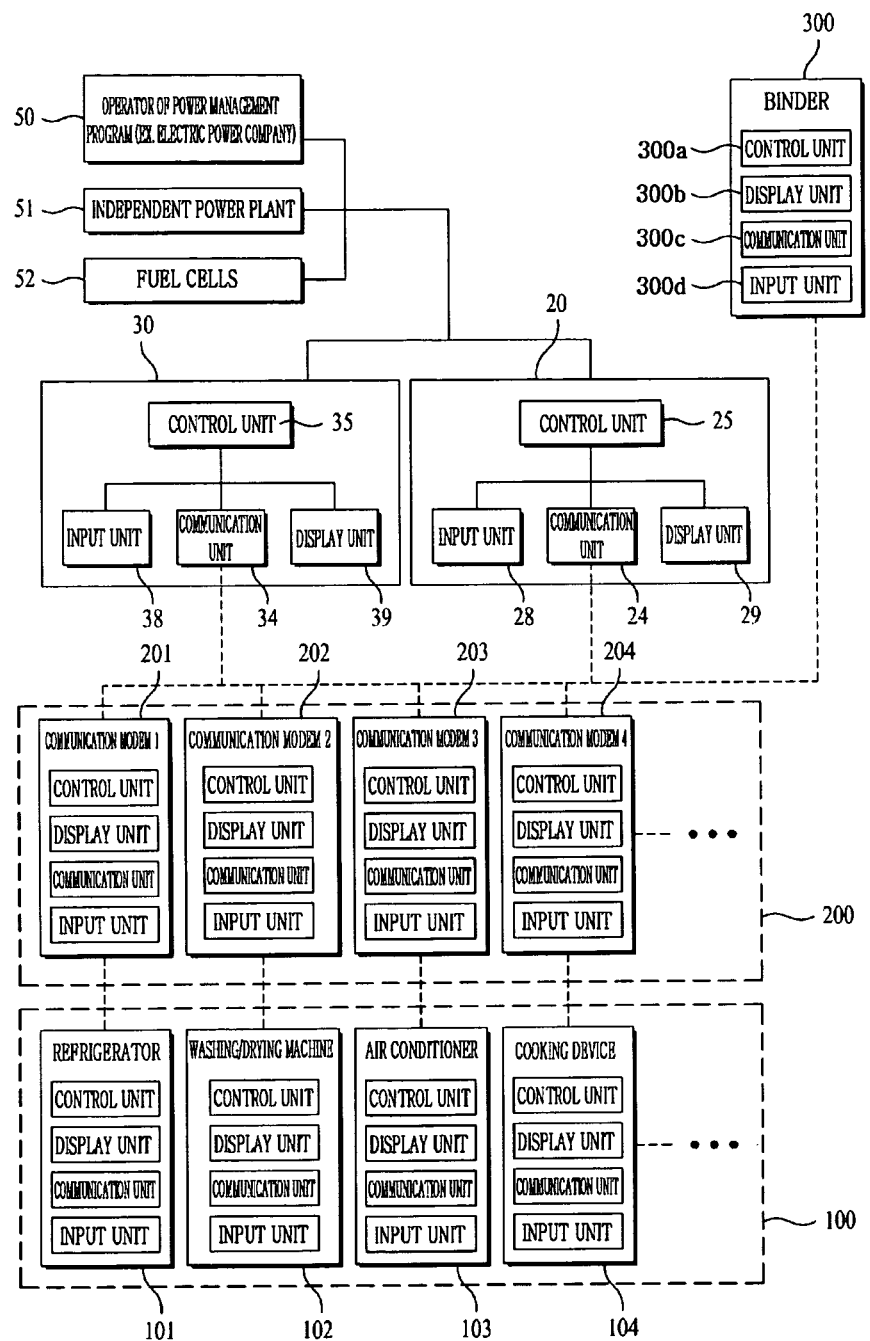
FIG. 2 is a block diagram of a power management network according to an embodiment.

FIG. 2 is a block diagram of a state in which each component is connected to a power management network according to an embodiment.

Referring to FIG. 2, a power management program operator 50 may be an electric power company having a general power generation plant (e.g., thermal power, nuclear power, and water power generation plants) or a power generation plant using renewable energy sources (e.g., solar light, wind power, and geothermal power) as a power supply source. However, the power management program operator 50 is not limited thereto.

In addition, the power management network 10 may include an independent power plant 51 such as a solar power generation plant of a residential customer or office and fuel cells 52 of a fuel cell vehicle or a residential customer as other power supply sources. Such power supply sources and the power management program operator 50 may be connected to the metering device (smart meter) 20 and the EMS 30.

In addition, the metering device (smart meter) 20 and the EMS 30 may communicate with the electric products through the communication modems 200.

The metering device (smart meter) 20 may include a first control unit 25, a first input unit 28, a first communication unit 24, and a first display unit 29. The EMS 30 may include a second control unit 35, a second input unit 38, a second communication unit 34, and a second display unit 39.

The communication units 34 and 24 communicate with the communication modems 200 (201 to 204) of the in-house electric products 100 such as the refrigerator 101, the washing or drying machine 102, the air conditioner 103, and the cooking device 104 to transmit and receive power information and operation information.

In at least one of the EMS 30 and the metering device (smart meter) 20, the control units 25 and 35 check information in real time, such as setting information input by a user through the input unit 28 or 38, existing accumulated operation and power consumption history information of the electric products 100, and external power supply information. Also, the EMS 30 or the metering device (smart meter) 20 processes such information to control operations of the electric products and power supplied to the electric products.

The display units 29 and 39 display power information supplied from the power supply sources or operation and power information of the electric products, and communication states of the electric products 100.

The EMS 30 or the metering device (smart meter) 20 controls operations of the electric products so that the electric products perform a saving mode, for example, an electricity charge saving mode for saving electricity charges (energy charges) of the electric products or an energy saving operation mode for reducing power consumption. The electricity charge saving mode may be performed, based on information with respect to electricity rates changed in real time according to operation times of the electric products.

The EMS 30 or the metering device (smart meter) 20 controls the electric products in consideration of a peak time period in which electricity charge is the most expensive in a day, or in consideration of an upper limit of power consumption or electricity charge.

The electricity charge saving mode is controlled based on the peak time period or the upper limit of the power consumption. Also, the electric products may be jointed to the power management program provided by the electric power company to effectively perform a saving operation (e.g., energy saving operation and electricity charge saving operation).

If electric power is managed by joining the power management program, electricity charge may be saved, and moreover other effects may be attained such as getting a benefit of electricity charge reducing policies.

The communication modems 200 (201 to 204) may include control units, display units, communication units, and input units. Thus, the communication modems 201 to 204 may display current communication states and receive user's inputs.

The communication modems 200 are connected to the EMS 30 or the metering device (smart meter) 20 for communication and transmit commands according to the power management program to the electric products 100. Thus, the electric products 100 may be controlled according to the power management program.

In addition, the control units of the communication modems 200 may be configured to control the electric products 100 according to time-varying electricity rates, an upper limit of electricity charge, or an upper limit of power consumption. That is, the electric products 100 may operate in power-saving operation mode such as the electricity charge saving mode or the energy-saving operation mode under self control conditions using the communication modems 200.

Each of the electric products 100 may include a display unit and a control unit. The display unit may display an operation state of the electric product 100 and a communication state of the communication modem 200 of the corresponding electric product 100.

Therefore, a user may easily check communication states (whether communication therebetween is possible) of the communication modems 200 through at least one of the EMS 30, the metering device (smart meter) 20, the communication modems 200, and the electric products 100. If any one of the communication modems 200 is abnormal, the user may reinstall the communication modem 200 on the electric product 100 or replace the communication modem 200.

The past operation information or power consumption information for each time may be stored in the control unit of the electric product 100. The information may be used when the power management program is performed by itself during emergency such as out of communication of the communication modem 200.

The binder 300 includes a control unit 300a, a display unit 300b, a communication unit 300c, and an input unit 300d. Also, the binder 300 grants the home code to a non-registered electric product. The electric product to which the home code is granted may be registered in the power management network 10.

When the electric product is registered in the power management network 10, the electric product may become a component of the power management network in which the power management program provided from the power company is performed. The electric product is operated to reduce an electricity charge, power consumption, or a carbon discharge amount according to a command of the power management program.

The communication unit 300c communicates with a communication unit of a registration object electricity product, and the input unit 300d receives a registration command of the registration object electricity product. Typically, the registration command is entered by manipulating the input unit 300d using a user s hand. Also, the display unit 300b displays information related to the registration, i.e., the home code, a product code, and whether the registration is completed.

The control unit 300a is connected to the display unit 300b, the communication unit 300c, and the input unit 300d. Thus, when an input command for registration occurs, the control unit 300a controls the electric product that is a registration object to output a home code transmission command related to the power management network. Here, the control unit 300a may output a control command for granting a product code, selectively, an identification code as well as the home code.

Figure 3:
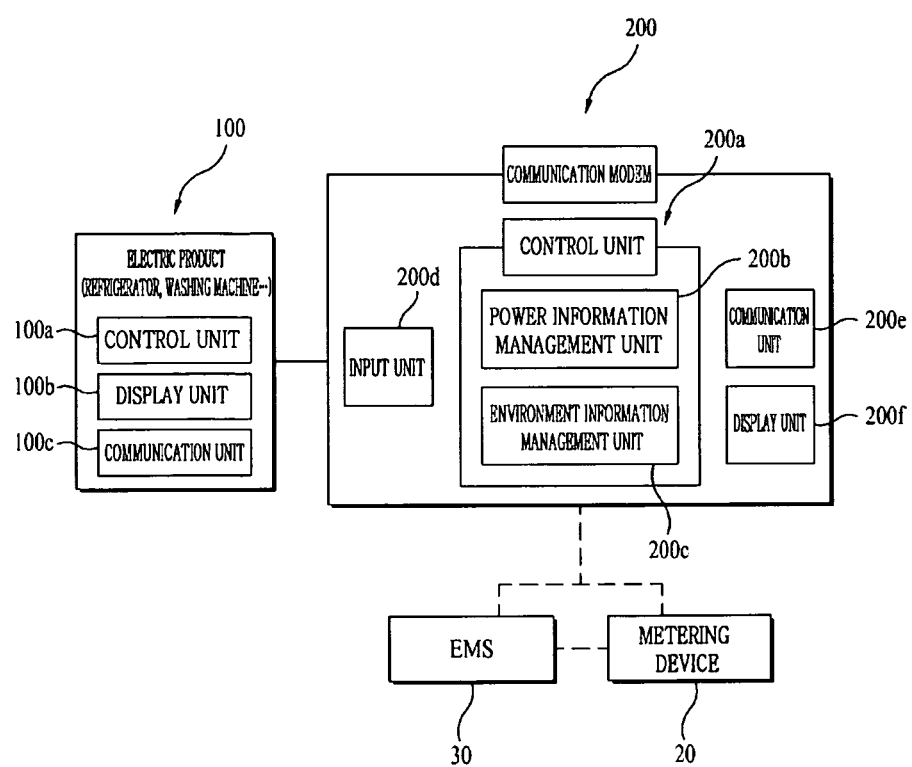
FIG. 3 is a control block diagram of a power management network according to an embodiment.

As shown in FIG. 3, the communication modem 200 includes a control unit 200a, an input unit 200d, a communication unit 200e, and a display unit 200f. The control unit 200a includes a power information management unit 200b and an environment information management unit 200c. An electric product 100 comprises a display unit 100b and a communication unit 100c.

The power information management unit 200b stores information with respect to an electricity charged in real time. That is, the power information management unit 200b stores operation information of the electric product 100 connected to the communication modem 200 and information with respect to power consumption depending on each operation mode. When the operation of the electric product 100 is required, the power information management unit 200b recommends a power saving operation mode based on the foregoing information or grants a command for executing the power-saving operation mode.

The environment information management unit 200c may store data with respect to a carbon dioxide emission amount corresponding to power consumption (or electricity charge) depending on each operation mode of the electric product 100 and calculate (recognize) the carbon dioxide emission amount. Also, when the carbon dioxide emission amount exceeds a predetermined reference, the environment information management unit 200c may warns the excess of the carbon dioxide emission amount or give an operation stop or delay command to the electric product 100.

The carbon dioxide emission amount may be displayed as a weight unit. Alternatively, the carbon dioxide emission amount may be displayed as the number of tree, which absorbs carbon dioxide as much as the weight.

The power information management unit 200b and the environment management unit 200c may communicate with the EMS 30 or the metering device 20 to transmit and receive the information with respect to the power-saving operation mode included in the power management program or perform update of the information.

As described above, each of the power information management unit 200b and the environment management unit 200c may be provided as a component of the communication modem, or as a component of the EMS 30 or the metering device 20. That is, the power information management unit 200b and the environment management unit 200c are not limited to their position.

The control unit 100a of the electric product 100 controls an operation of the electric product 100, based on the information with respect to the electricity charge or the carbon dioxide emission amount, which is transmitted from the power information management unit 200b and the environment management unit 200c and the operation command according to the information.

Figure 4:
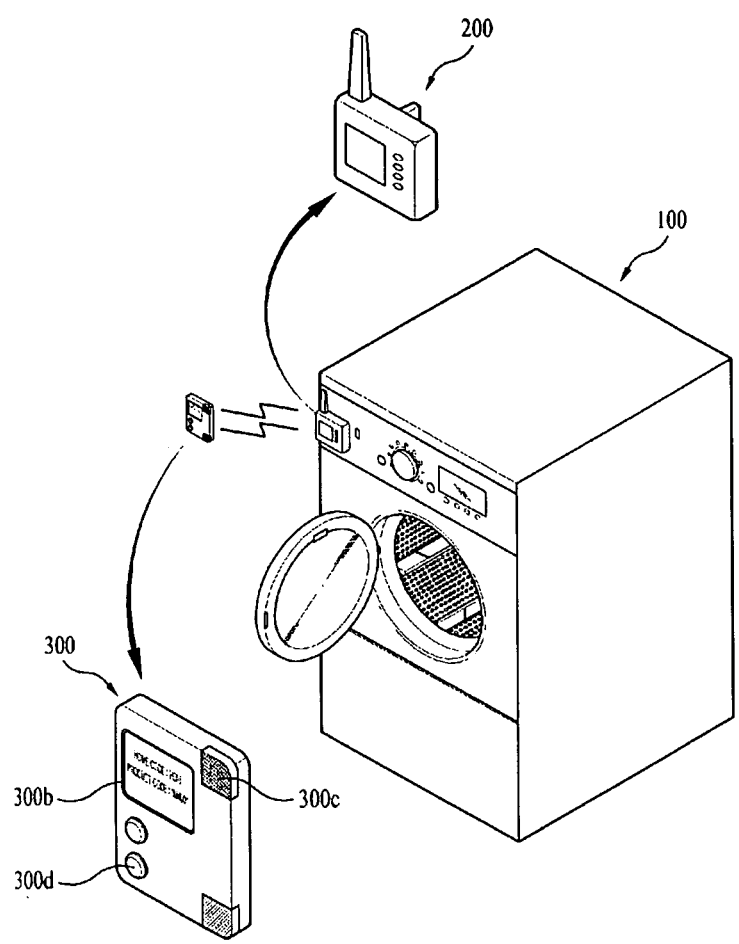
FIG. 4 is a perspective view illustrating a state in which a communication modem is mounted on an electric product according to an embodiment.

As shown in FIG. 4, the communication modem 200 is fitted into a coupling part (e.g., port or slot) disposed in the electric product 100. Since the user easily installs or separates the communication modem 200 on/from the electric product 100, cumbersome procedures such as call of a servicer are not required when the communication modem 200 is connected to the power management network to perform the power management program.

In the state where the communication modem 200 is mounted on a non-registered electric product 100 that is a registration object, when the user pushes the input unit 300d having a button shape after the binder 300 approaches the communication modem 200, a home code related to the power management network may be granted to register the non-registered electric product 100.

Here, the display unit 300b may display at least one or more of the home code, the product code, and the identification code.

The binder 300 and the communication modem 200 may perform the registration process through the home code grant in a near field communication manner by which the communication therebetween is possible only within a predetermined distance. Thus, the communication between the binder 300 and the communication modem 200 may not affect other electric products.

Figure 5:
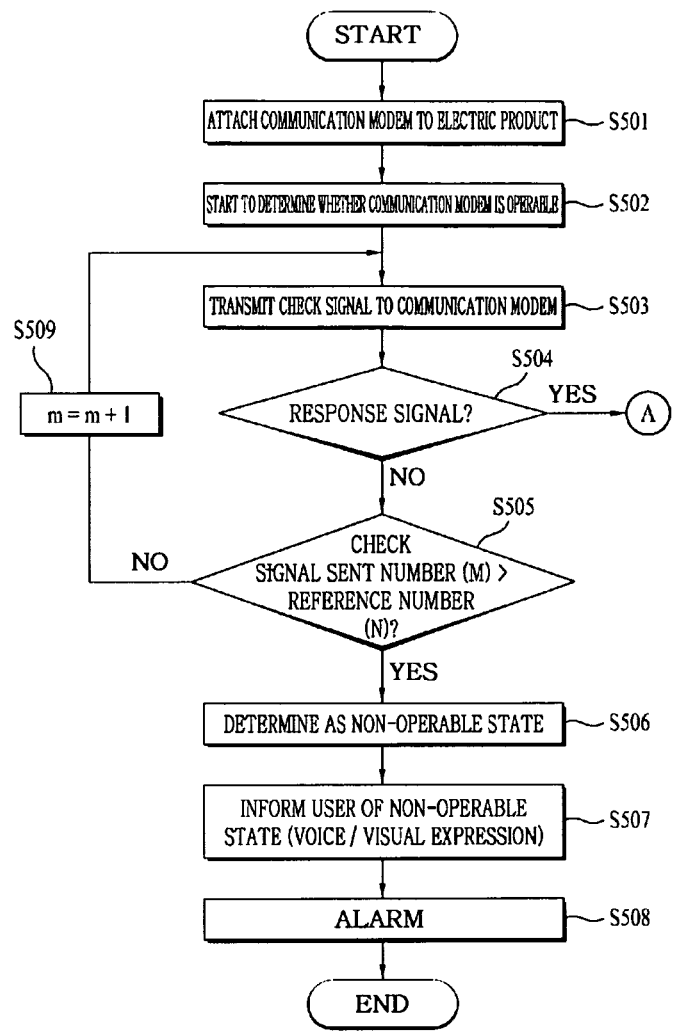
FIGS. 5 to 7 are flowcharts illustrating a process of controlling a network system according to an embodiment.
Figure 6:
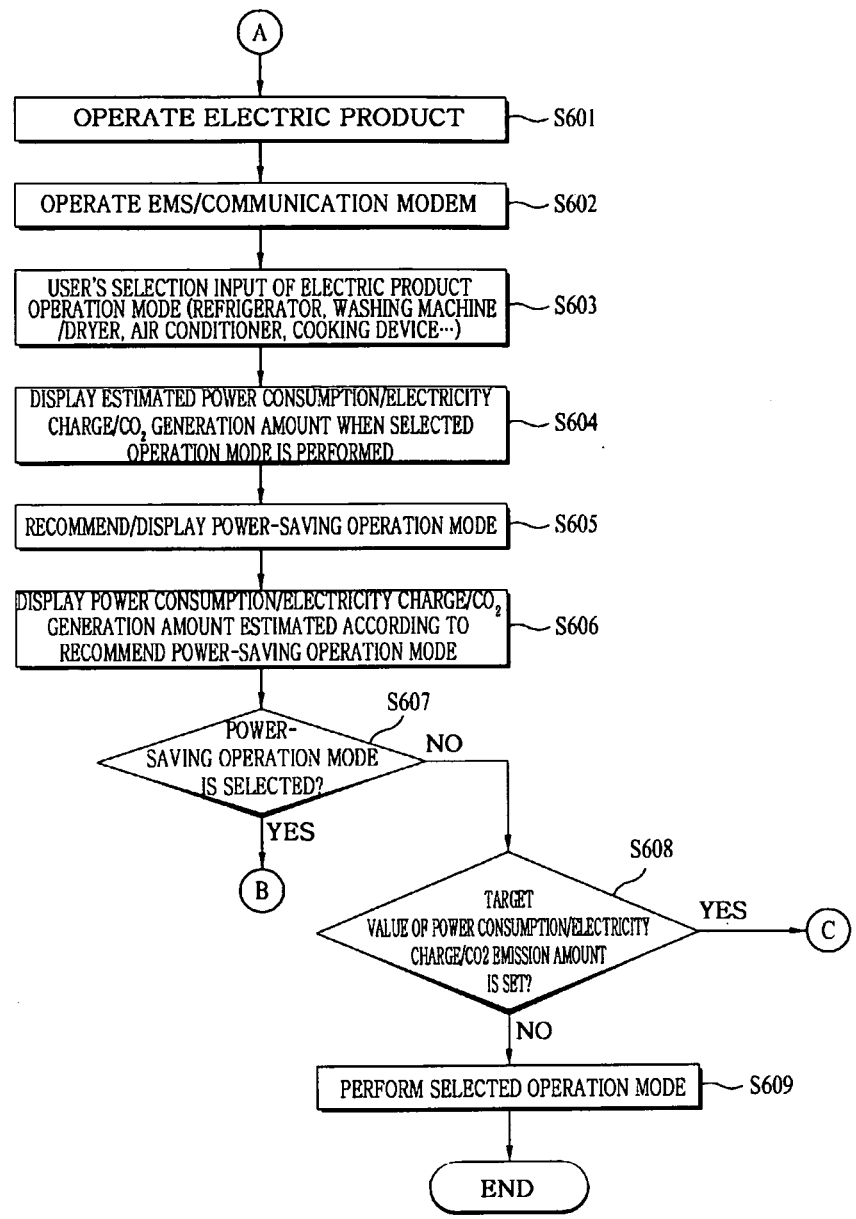
Figure 7:
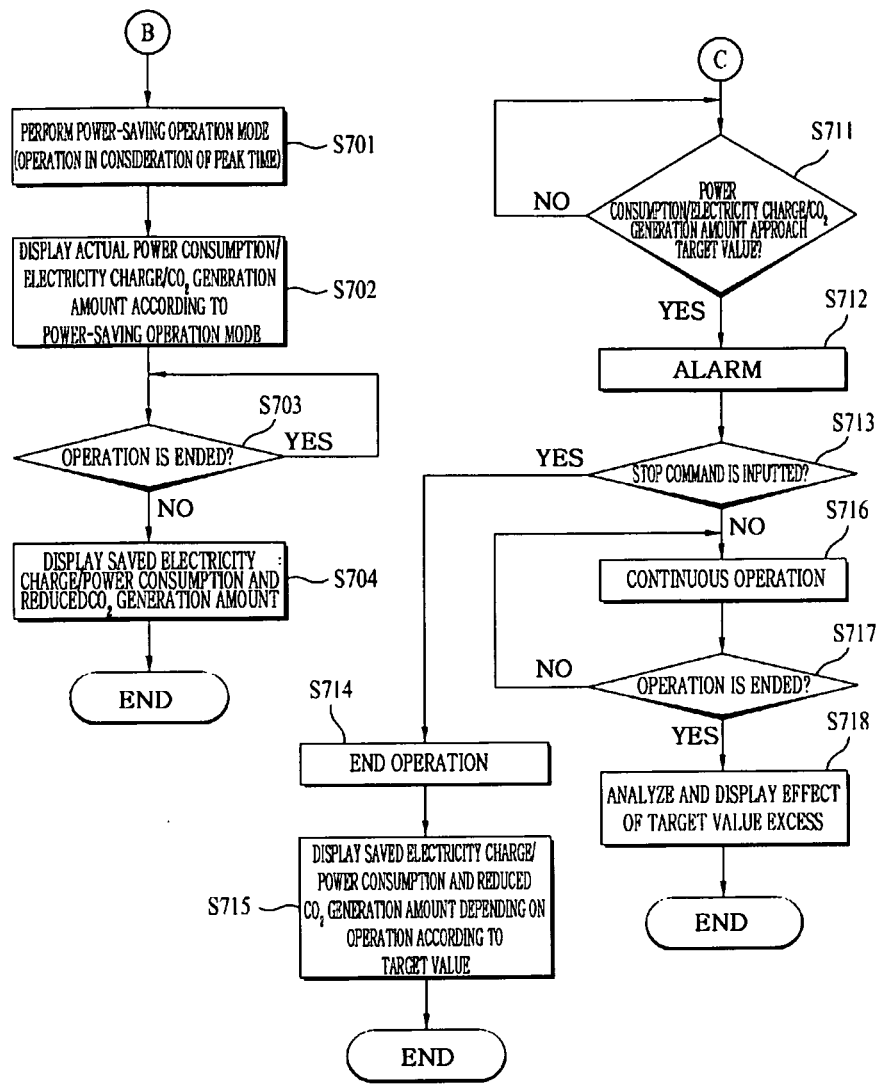

Hereinafter, a control operation according to an embodiment will be described with reference to the accompanying drawings. FIGS. 5 to 7 are flowcharts illustrating a process of controlling a network system according to an embodiment.

Referring to FIG. 5, when a communication modem is mounted on a specific electric product in operation S501, it is started to check whether the mount of the communication modem is defective or the communication of the communication modem is possible in operation S502. In operation S503, a check signal may be transmitted from the EMS, the metering device (smart meter), or the corresponding electric product into the communication modem.

In operation S504, it is determined whether the communication modem outputs a response signal. If it is determined that there is no response signal, it is determined whether the sent number (m) of the check signal exceeds a predetermined reference number (n) in operation S505. Since it is not reliable to determine the communication state of the communication modem after sending a check signal once, the check signal is sent several times to reliably determine the communication state of the communication modem. If the communication modem does not response although the check signal is sent several times, it is determined that the communication modem is not operable for communication.

In the state where there is no response signal, if the sent number (m) of the check signal does not exceed the reference number (n), a check signal sending process is performed again in operations S509 and S503. On the other hand, in the state where there is no response signal, if it is determined that the sent number (m) of the check signal exceeds the reference number (n), it is determined that the communication modem is not operable for communication in operation S506.

To rapidly inform the non-operable state of the communication modem connected to a specific electric product to a user, the non-operable state of the communication modem is displayed on at least one of the EMS, the metering device (smart meter), and the corresponding electric product to inform it to the user in operation S507. Here, the non-operable state may be reported by a sound expression such as an alarming sound as well as a visual expression.

If the non-operable state continues, an alarming message may be displayed to warn the user of the possibility of regarding it as withdrawal from a power management program provided by the electric power company and the resulting disadvantages in operation S508.

As shown in FIG. 6, if there is a response signal from the communication modem, it is determined that the communication modem is properly attached to the electric product and operable for communication in operation S601. In this state, when the user operates the electric product in operation s601, the EMS and the metering device are operated to operate the communication modem in operation S602.

Also, when the user randomly selects an operation mode of the electric product to input the selected operation mode in operation S603, power consumption, an electricity charge, a carbon dioxide emission amount, which are estimated when the randomly selected operation mode is performed are calculated by the power information management unit or the environment management unit, and then, the calculated results are displayed on each display unit of the energy management device, the metering device, and the electric product in operation S604.

In operation S605, a power saving operation mode, which has a function (operation effect) similar to that of the operation mode selected by the user and reduces the power consumption, the electricity charge, and the carbon dioxide emission amount is recommended and displayed. Also, in operation S606, estimated power consumption, electricity charge, and carbon dioxide emission amount depending on the power saving operation mode may be displayed.

Figure 10:
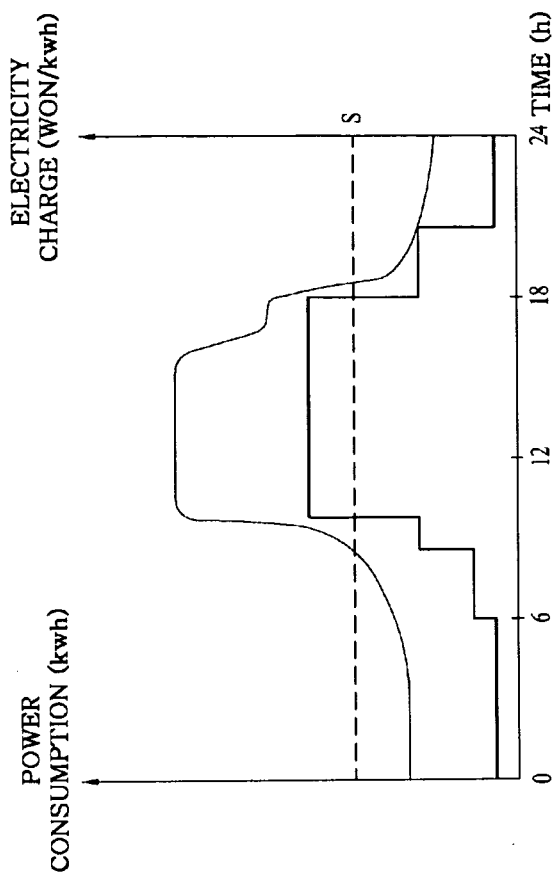
FIG. 10 is a graph of an electricity charge and power consumption depending on a time.

In operation S607, it is determined whether the power saving operation mode is selected. As shown in FIG. 7, if the user selects the power saving operation mode, the power saving operation mode is performed. As shown in FIG. 10, in operation S701, the power saving operation mode may be an operation mode for minimizing the power consumption or stopping an operation of the electric product in the peak time period in which the electricity charge is above a set value S.

In operation S702, actual power consumption, electricity charge, carbon dioxide emission amount are displayed during the power saving operation mode. In operation S703, it is determined whether the operation is ended. When it is determined that the operation is ended, an actually saved electricity charge, power consumption, and a reduced carbon dioxide emission amount may be displayed to allow the user to recognize the information S704.

Referring again to FIG. 6, when the user does not select the power saving operation mode, it is determined whether a target value of at least one of an electricity charge, power consumption, and a carbon dioxide emission amount is set in operation S608. If the target value is not set, the operation mode selected by the user is performed in operation S609.

If the target value is set, as shown in FIG. 7, it is determined whether current electricity charge, power consumption, or carbon dioxide emission amount approaches the target value during the operation according to the target value in operation S711. For example, a degree approaching the target value may be about 90% of the target value.

In operation S712, when the electricity charge, the power consumption, or the carbon dioxide emission amount approaches the target value, a warning event is generated to allow the user to recognize the information in operation S712.

In operation S713, it is determined whether the user inputs a stop command. When the stop command is inputted to end the operation in operation S714, an electricity charge, power consumption, or a carbon dioxide emission amount saved by the operation depending on the target value is displayed m operation S715.

On the other hand, when the operation is continues in operation S716, it is determined whether the operation is ended in operation S717. In case where the electricity charge, the power consumption, or the carbon dioxide emission amount exceeds the target value, exceeded factors are analyzed, and then, the analyzed results are displayed in operation S718.

Figure 8:
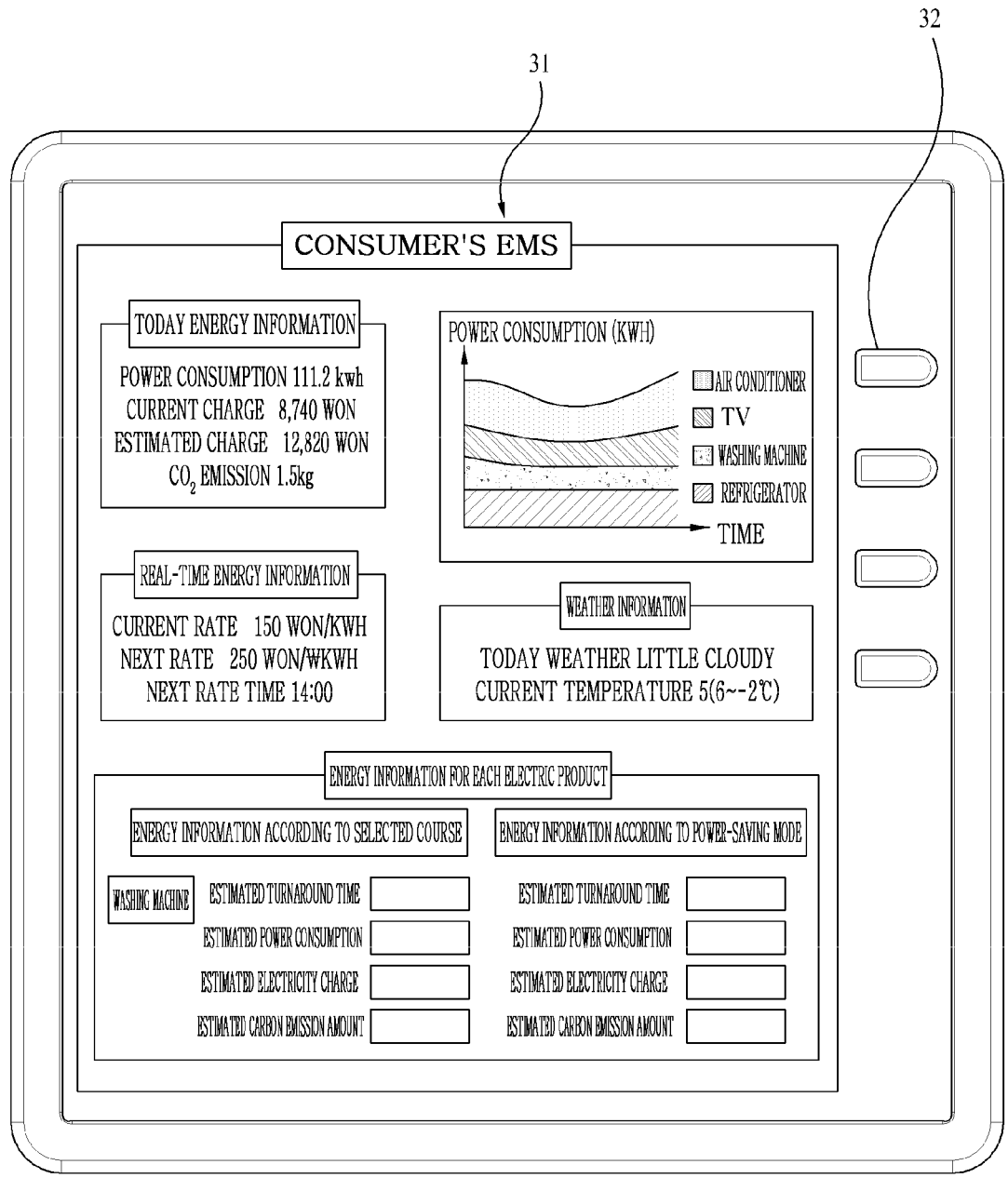
FIGS. 8 and 9 are views of an energy management system displaying results according to the control method.
Figure 9:
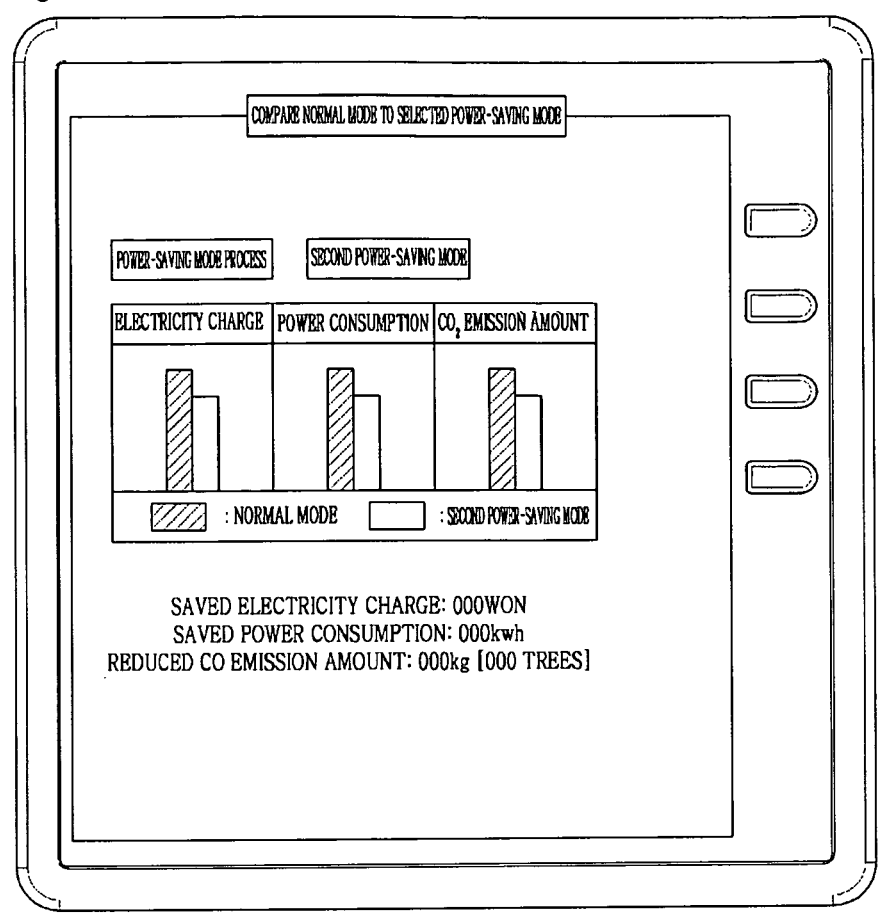

FIGS. 8 and 9 are views of an energy management system 30 displaying results according to the control method.

Referring to FIG. 8, since the estimated energy information depending on the selection mode selected by the user and the estimated energy information depending on the energy saving mode calculated and recommended by the power information management unit and the environment management unit are comparably displayed, the user compares the two modes.

Also, FIG. 9 illustrates results obtained by comparing the selection mode to the power saving mode after the operation is ended. Thus, the user may recognize the saved electricity charge and power consumption or the reduced carbon dioxide emission amount, which are actually selected by oneself.

Figure 11:
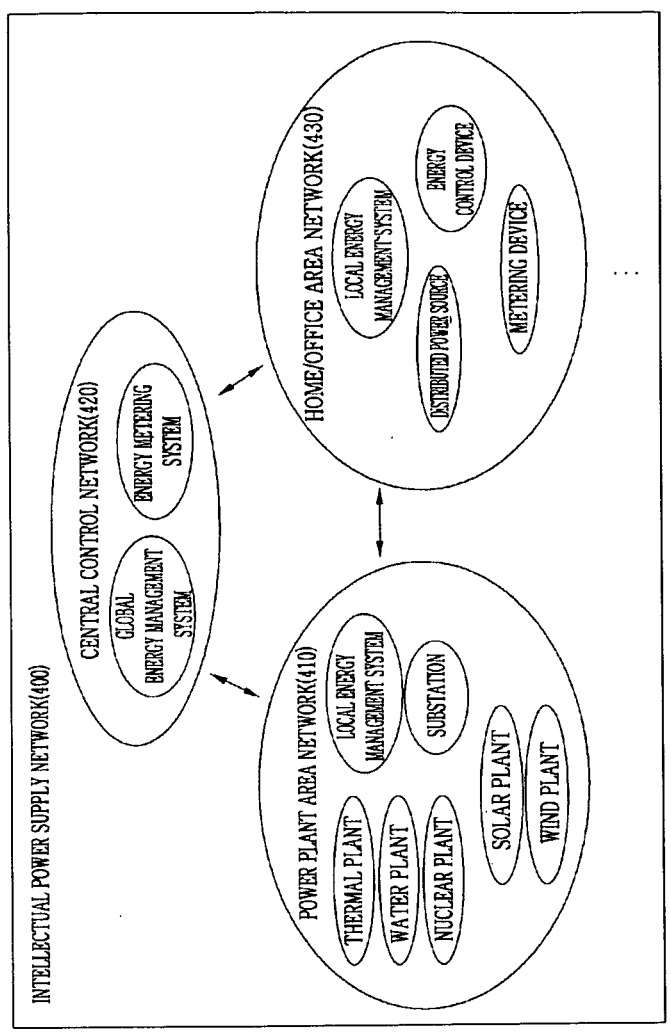
FIG. 11 is a schematic view of an intellectual power supply network according to another embodiment.

FIG. 11 is a schematic view of an intellectual power supply network according to another embodiment.

Referring to FIG. 11, an intellectual power supply network 400 may include at least one local area network or at least one global area network. For example, the local area network may include a power plant area network 410 capable of sharing power information (energy information) between power plants, a home area network 430 capable of sharing power information between electric appliances within a house, an office area network 430 capable of sharing power information between electric appliances within an office, or a central control network 420 capable of controlling power information between local areas. The home area network 430 and the office area network 430 are called a "power consumption area network".

The global area network may represent a network including at least two or more local area networks. Also, the global area network may be understood as a relative concept corresponding to the local area network.

As one example of the intellectual power supply network 400 applied to the present disclosure, the intellectual power supply network 400 may include the power plant area network 410, the central control network 420, and at least one home/office area network 430.

The power plant area network 410 may include a power plant generating an electric power through thermal power generation, nuclear power generation, or water power generation and solar and wind power plants, which respectively use renewable solar energy and wind power. Here, a unit constituting the power plant area network 410 such as the thermal power plant and the nuclear power plant may be called a "power plant component".

An electric power generated in a thermal power plant, a nuclear power plant, or a water power plant is supplied into a substation through a power line, and the substation converts voltage or current properties to distribute the converted electric power into consumers within the home/office area network. Also, the electric power generated using the renewable energy is supplied into the substation, and then is distributed into each of the consumers.

The intellectual power supply network 400 may include an energy management system (EMS). The EMS represents a system for managing an energy control device using an energy management program. For example, the energy control device may include an automatic temperature control device, a cable set-top box, and an intellectual display device, and an automatic lighting control device. The energy management system may communicate with the energy control device to manage power of each residential consumer in real time. Also, the energy management system may estimate power consumption in real time, based on accumulated data. The energy management system may be set for each residential consumer or supplier, and furthermore, may be set for each local area network or each global area network. Also, the energy management system may be provided as an energy management device. For example, a real-time price signal of an electricity market is broadcasted through a local energy management system installed in each home. Since the local energy management system communicates with each electric appliance to control the electric appliance, a user may recognize power information of each electric appliance through the local energy management system and perform a power management such as power amount limitation set-up or electricity charge limitation set-up, based on the power information, thereby saving energy and costs.

The intellectual power supply network may include an energy metering system. The energy metering system represents a system, which measures energy usage through metering devices to collect and analyze information with respect to use of energy. For example, the metering devices may include an electricity meters, gas meters, and water meters.

The energy management system and the energy metering system may allow the user to efficiently use electricity. Also, the energy management system and the energy metering system may detect errors with respect to a system to allow a power supplier to efficiently operate the system.

For example, when the real-time price signal of the electricity market is broadcasted through the energy management system installed in each home, since the energy management system communicates with each electric appliance to control the electric appliance, the user may recognize the power information of each electric appliance through the local energy management system and perform the power management such as the power amount limitation set-up or the electricity charge limitation set-up, based on the power information, thereby saving energy and costs.

In case of the home area network 430, residential customers may produce electricity by itself using a solar battery or fuel cell of a plug in hybrid electric vehicle (PHEV) for their consumption, and the remaining electricity may be supplied or sold into the other local area network. Also, an energy metering device may be provided in each of local area networks to check an electric power consumed for each of the consumers or electricity bills in real time, and thus a power supply unit within the local area networks may recognize the present power consumption amount and electricity charge to take action for reducing power consumption or electricity costs based on the real-time information about the power consumption and electricity charge. Also, two-way communication may be possible between the local area networks or units within the local area networks. In addition, the two-way communication may be possible between a unit within one local area network and a unit within the other local area network. Here, the unit may include a power plant, an electric company, a distributed power source, an energy management system, an energy metering system, an intellectual device, or an electric device. For example, the two-way communication may be possible between the power plant area network 410 and the home area network 430, and also between electric appliances within the home area network 430. Or, the two-way communication may be possible between the power plant within the power plant area network 410 and the energy management system within the home area network 430. Thus, the power consumption of each of the consumers may be monitored and managed to adequately product and distribute electricity.

Figure 12:
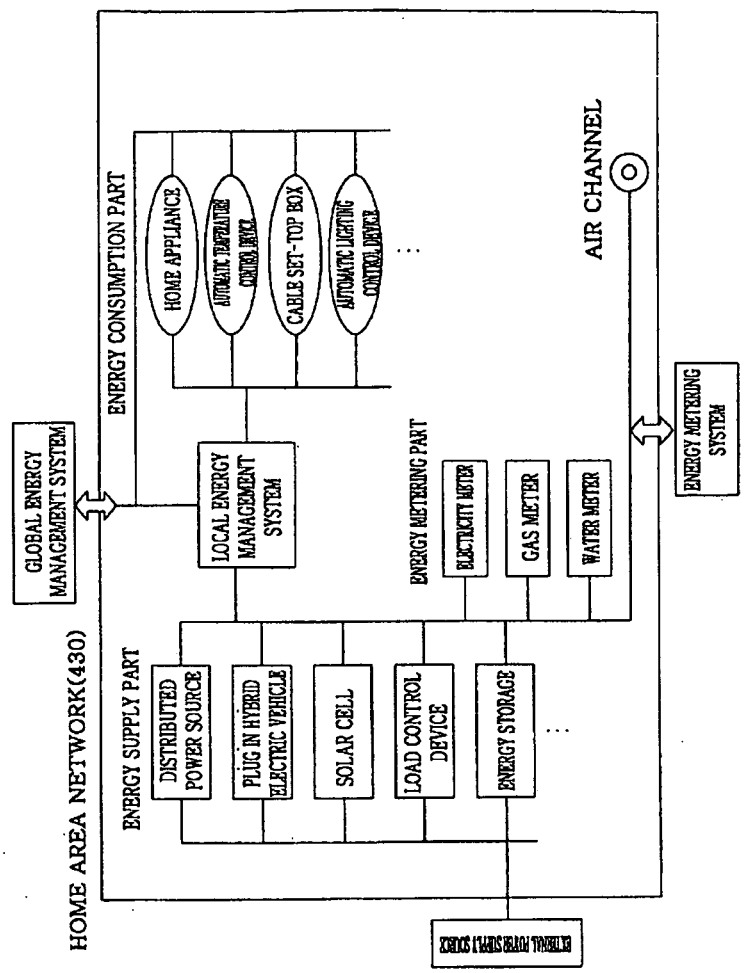
FIG. 12 is a schematic view of a home area network according to another embodiment.

FIG. 12 is a schematic view of a home area network according to another embodiment.

Referring to FIG. 12, a house area network 130 may correspond to one local area network within an intellectual power supply network. The home area network 130 may mutually communicate with the other local area network within the intellectual power supply network. Also, the home area network 130 may independently perform energy supply, consumption, storage, measurement, management, and communication. The home area network 130 may largely include an energy supply part, an energy consumption part, an energy metering part, and a local energy management system. Also, the home area network 130 may receive information for a general management of units therein through air channels. For example, the information receivable through the air channels may include a unit identifier, the present electricity charge information, relative level information of the present charge (e.g., high, middle, low), use information (e.g., residential, commercial), and error confirmation information (e.g., CRC information). A module for receiving broadcasting signals may include a digital multimedia broadcasting-terrestrial (DMB-T), a digital multimedia broadcasting-satellite (DMB-S), a media forward link only (mediaFLO), a digital video broadcast-handheld (DVB-H), and an integrated services digital broadcast-terrestrial (ISDB-T). The information obtained from the energy metering part may be transmitted into an external energy metering system, and the information obtained from the local energy management system may be transmitted into an external global energy management system or the other local energy management system.

The energy supply part may supply an electric power to the whole units within the home area network 130. The energy supply part may include a distributed power source, a plug in hybrid electric vehicle (PHEV), a solar cell, a load control device, and an energy storage. The distributed power source may represent the other power source except a power source supplied from the existing power plant, for example, a power source supplied from the other local area network or a self-powered supply source (plug in hybrid electric vehicle, solar cell). The distributed power source, the plug in hybrid electric vehicle, and the solar cell may produce and store electricity by oneself and provide the produced electricity to the other local area network. The load control device controls the devices by which the electricity is consumed within the home area network 130. The energy storage stores energy supplied from the external power supply source. Also, as necessary, the energy storage distributes the energy into the units within the home area network 130.

The energy consumption part consumes the energy supplied from the energy supply part, based on a command transmitted from the local energy management system. The energy consumption part may include a home appliance, an automatic temperature control device, a cable set-top box, and an automatic lighting control device.

The energy metering part is connected to the energy supply part or the energy consumption part to measure energy consumption and collect information with respect to the energy consumption, thereby analyzing the collected information. The energy metering part may include an electricity meter, a gas meter, and a water meter. The information obtained from the energy metering part may be transmitted into the energy metering system.

The whole units within the home area network may mutually communicate with each other. Also, each of the units may include an intellectual device or an energy management program.

Hereinafter, another embodiment according to the present disclosure will be described. Only differences between the present embodiment and the previous embodiment will be mainly described, and the same portions will be denoted by the same description and reference numeral as those of the previous embodiment.

Figure 13:
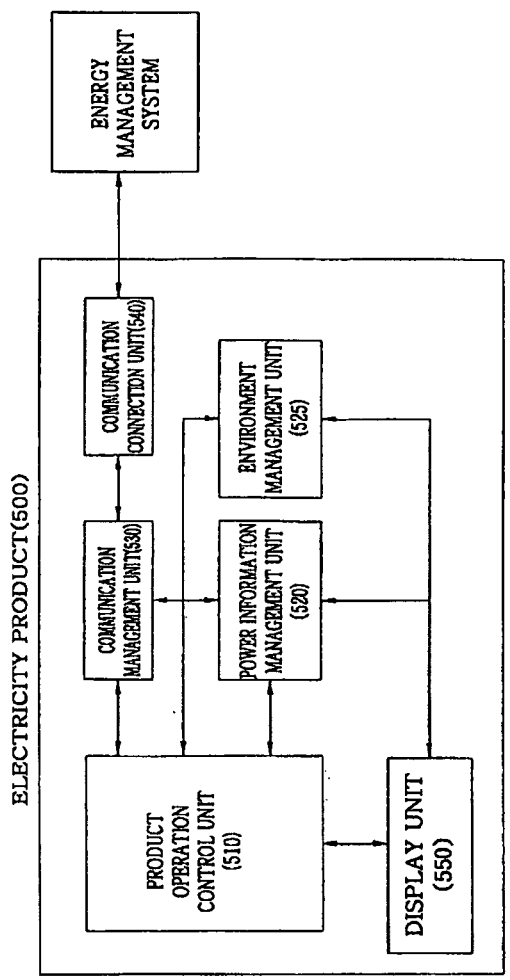
FIG. 13 is a block diagram illustrating internal components of an electric product according to another embodiment.

FIG. 13 is a block diagram illustrating internal components of an electric product according to another embodiment.

Referring to FIG. 3, an electric product 500 includes a product operation control unit 510, a power information management unit 520, an environment management unit 525, a communication management unit 530, a communication connection unit 540, and a display unit 550. When the units are realized in an actual application, as necessary, two or more units may be combined into one unit, or one unit may be divided into two or more units. For example, the power information management unit 520, the environment management unit 525, the communication management unit 530, and the communication connection unit 540 may be coupled to the electric product 500 as separate devices or separately disposed.

Hereinafter, the units will be described in order.

The product operation control unit 510 controls overall operations of the electric product 500. For example, the product operation control unit 510 controls an operation of each unit of the electric product 500 according to a product operation command transmitted from the power information management unit 520 or the environment management unit 525 to perform functions of the electric product 500. Also, the product operation control unit 510 may control operations of the power information management unit 520, the communication management unit 530, and the display unit 550 according to information inputted by a user.

The power information management unit 520 processes and manages the power information received from the communication management unit 530. For example, the power information management unit 520 identifies electricity rate information of data received from the communication management unit 530 to transmit a product operation command for reducing the power consumption of the electric product based on the electricity rate information into the production operation control unit 510. The power information management unit 520 may be provided as a power information management module within the product operation control unit 510. For example, the power information management module may be provided as hardware within the product operation control unit 510 or as software separated from the product operation control unit 510.

Here, the electricity information (energy information) may include current power conditions (e.g., power consumption per time or current power rate condition), power quality conditions (e.g., frequency, neutralizing voltage, and high-frequency conditions), environment conditions (e.g., intensities of temperature, moisture, movement, wind, and light), accumulated power consumption costs, instantaneous power consumption costs, power consumption costs per time, energy costs for time-of-use energy rates, costs for critical peak pricing, costs for capacity billing rates, costs for demanded factors (e.g., tax, rental fee, and discount), power consumption costs for parameters defined by the user, power consumption costs for critical history, power productivity/consumption for critical history, or environmental influence information (e.g., carbon dioxide discharge amount, and carbon dioxide discharge estimation amount).

The power information may be processed within the power information management unit 520 to transmit the processed power information into other units within the global area network or the local area network through the communication management unit 530 and the communication connection unit 540 or may be outputted through the display unit 550.

The environment information management unit 525 transmits a product operation command, by which a carbon emission amount generated from the electric product is calculated to display the carbon emission amount on the display unit 550, into the product operation control unit 510. Here, the carbon emission amount of the electric product may be calculated power consumption information received from the power information management unit 520, for example, power usage information depending on the power consumption. The carbon emission amount multiplies an operation time of the electric product by a weight depending on an operation level, and then by an environmental impact index with respect to manufacturing/disuse of the corresponding electric product.

Also, the environment information management unit 525 may transmit a product operation command into the product operation control unit 510 to display environment information, e.g., exhaust information, weather information, etc., received from the outside through the communication management unit 530 on the display unit 550.

The communication management unit 530 has a proper identification number of the electric product 10. Also, the communication management unit 530 manages data transmitted/received through the communication connection unit 540. For example, the communication management unit 530 may transmit power consumption information or environment information of the electric product within the home area network into the local energy management system or the global energy management system through the communication connection unit 540 and receive power consumption information or environment information from the other electric products within the home area network or the power plant area network.

The communication connection unit 540 may serve as an interface that can mutually communicate with the whole units within the global area network or the local area network. The communication connection unit 540 may include a broadcast receiving module, a mobile communication module, a wireless internet module, a near filed communication module, and a global positioning system (GPS). The broadcast receiving module receives broadcasting signals and/or broadcasting-related information from an external broadcast management server through broadcasting channels. For example, the electric product 500 may receive power consumption information, power supply information, or power management information of the other units within the global area network or the local area network as a signal form.

The display unit 550 may include a sound output module and an alarm output module. Also, the display unit 520 displays power information and processed by the power information management unit 520 and environment information processed by the environment information management unit 525. Examples of the power information and the environment information were previously described in the descriptions with respect to the power information management unit 520 and the environment information management unit 525.

For example, the display unit 550 may monitor the present energy conditions (e.g., power consumption per time or current power rate condition), current conditions of the corresponding electric product (e.g., operating, stand-by, and repairing), operation mode conditions (e.g., charging and using), power quality conditions (e.g., frequency, neutralizing voltage, and high-frequency conditions), environment conditions (e.g., intensities of temperature, moisture, movement, wind, and light), and environmental influence information (e.g., carbon dioxide emission amount).

In case of a touch screen having a mutually layered structure of the display unit 550 and a touch pad, the display unit 550 may be used as an input unit in addition to an output unit. The display unit 550 may include at least one of a liquid crystal display, a thin film transistor-liquid crystal display, an organic light-emitting diode, a flexible display, and a three-dimensional (3D) display. Also, two or more display units may be provided according to a realized configuration of the electric product 500. For example, the electric product 10 may include an external display module (not shown) together with an internal display module (not shown).

The sound output module outputs audio data received from the communication connection unit 540 in a signal reception, a speech recognition mode, and a broadcast receiving mode. Also, the sound output module outputs sound signals related to functions (e.g., power information receiving sound, event message receiving sound, and product operation status sound) performed in the electric product 500. The sound output module may include a speaker, a buzzer, etc.

The alarm output module outputs a signal for alarming event occurrence of the electric product 500. Examples of events occurring in the electric product 500 may include signal reception, message reception for informing charge limitation excess, a signal for informing carbon emission excess etc. The alarm output module may output the signal as a vibration form. When the signal or message is received, the alarm output module may be vibrated to inform the reception of the signal or message. The user may recognize the event occurrence through the vibration. Alternatively, the signal for informing the event occurrence may be outputted through the display unit 550 or the sound output module.

The electric product 500 may be provided in a portable terminal form or a plug device form. In case of the portable terminal form, the electric product 500 may have various types such as a folder type, a swing type, and a slide type.

Hereinafter, an energy management method, which is capable of being executed by the electric product will be described in detail.

Figure 14:
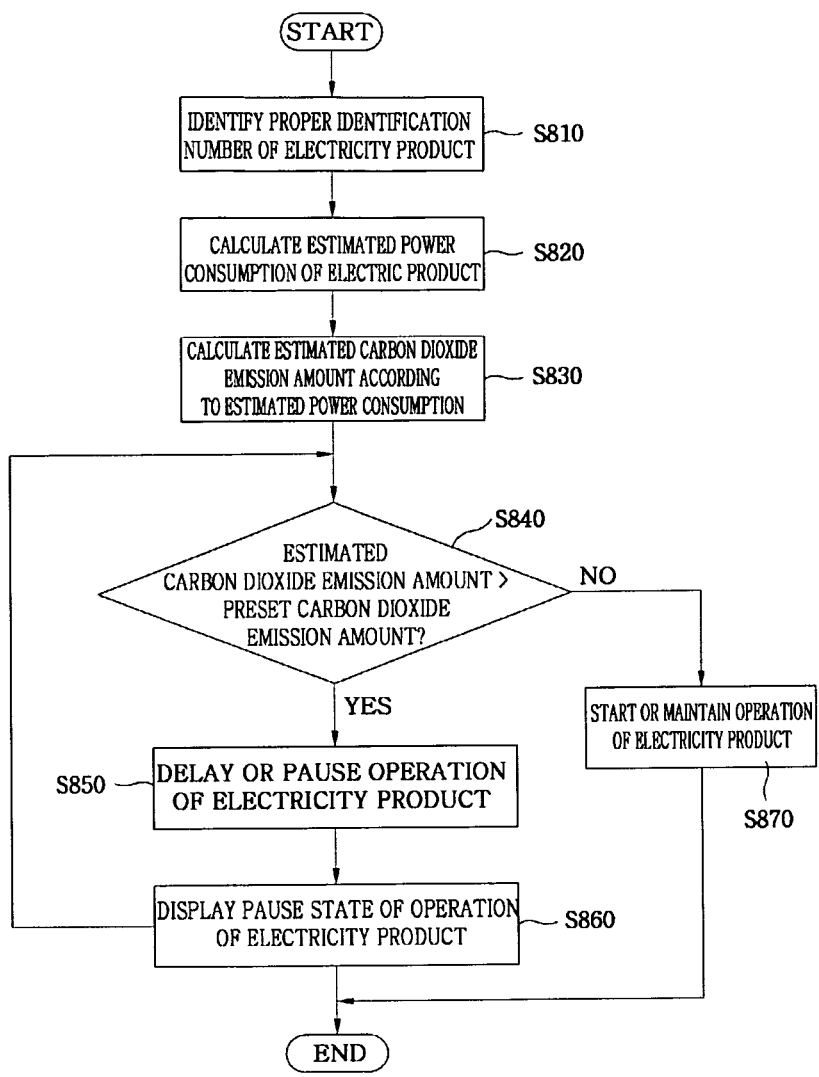
FIG. 14 is a flowchart illustrating a process of controlling an electric power in consideration of environmental effects according to another embodiment.

FIG. 14 is a flowchart illustrating a process of controlling an electric power in consideration of environmental effects according to another embodiment. Referring to FIG. 14, a method of controlling electricity in consideration of environment influence will be described.

In operation S810, a communication management unit may identify proper identification information of the electric product. In operation S820, an estimated power consumption of the electric product is calculated. Thus, a product operation command for minimizing power consumption costs of the electric product in consideration of the calculated estimated power consumption and real-time electricity charge information received from the communication management unit may be transmitted into a product operation control unit.

Also, in operation S830, an environment information management unit may transmit a product operation command, by which an estimated carbon dioxide emission amount of the electric product is calculated according to the estimated power consumption or the estimated electricity charge to display the estimated carbon dioxide emission amount on a display unit, into a product operation control unit.

Here, in operation S840, the environment information management unit may confirm whether the estimated carbon dioxide emission amount exceeds a preset limitation carbon emission amount or dioxide emission amount within the electric product. After confirming the result, when the estimated carbon dioxide emission amount exceeds the preset carbon dioxide emission amount within the electric product, the environment management unit transmits a product operation command for delaying or pausing an operation of the electric product into the product operation control unit, and the product operation control unit delays or pauses the operation of the electric product in operation S850. Then, in operation S860, the pause state of the electric product is displayed through the display unit. On the other hand, when the estimated carbon dioxide emission amount does not exceed the preset carbon dioxide emission amount within the electric product, the operation of the electric product is continuously maintained in operation S870.

The power information management unit may confirm whether an operation time of the electric product is within an electricity charge maximum period according to the received electricity charge information.

After confirming the result, when the operation time of the electric product is within the electricity charge maximum period, the power information management unit transmits a product operation command for delaying and pausing the operation of the electric product into the product operation control unit. Then, the product operation control unit delays or pauses the operation of the electric product according to the product operation command. Also, the pause state of the electric product is displayed through the display unit. When the operation of the electric product is in the pause state, it is determined whether the operation time of the electric product is out of the electricity charge maximum period for the continuous operation of the electric product. On the other hand, after confirming the result, when the operation time of the electric product is not within the electricity charge maximum period or out of the electricity charge maximum period after it is within the electricity charge maximum period, the operation of the electric product may be continuously maintained or the electric product is re-operated.

Here, when the operation of the electric product is temporarily paused or the electric product is re-operated, the display unit may include the sound output module for outputting the temporary pause or re-operation condition using sound.

Also, the communication management unit further receives power supply information from an external device, and the power information management unit compares the power supply information to estimated power consumption to transmit a product operation command for reducing the power consumption of the electric product into the product operation control unit. Here, when the estimated power consumption is greater than the power supply information, the power information management unit 12 may transmit the product operation command for temporarily pausing the operation of the electric product into the product operation control unit, and the power supply information shows power supply information in which the electricity change information is lowest.

Also, the above-described method of controlling the power, which is applied to the present disclosure, may be programmed as a program that is executed in a computer, and then may be stored in a computer-readable recording medium. Also, data having a data structure according to the present disclosure may be stored in the computer-readable recording medium. The computer-readable recording medium includes various storage devices in which computer-readable data is stored. Examples of the computer-readable recording medium include a ROM, a RAM, a CD-ROM, a magnetic tape, a floppy disk, and an optical storage device. In addition, the computer-readable recording medium may include a wavelength realized in a carrier wave form (e.g., transmission through an internet). Also, a bit stream generated by the energy management method applied to the present disclosure may be stored in the computer-readable recording medium or transmitted through wire/wireless communication network.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

According to the network system of the present disclosure, since the power management program is executed using the environment information management unit, the energy may be further efficiently managed within the intellectual power supply network. Therefore, industrial applicability is significantly high.

The invention claimed is:

1. A method for controlling a network system, the network system comprising: a metering device metering energy supplied from a power supply source; a communication device by which energy information related to the energy metered by the metering device is communicated between the metering device and an electrical product; an energy management device recognizing the energy information to control an operation of the electric product; and an environment information management device that estimates a carbon amount or a carbon dioxide amount, which is generated from the electric product, based on a power consumption value or an electricity charge of the electric product, wherein a power-saving operation mode of the electric product is selectively performed, based on the carbon amount or the carbon dioxide amount recognized by the environment information management device, wherein the energy management device comprises: a first display that displays a first estimated information depending on a user selection mode; and a second display that displays a second estimated information depending on a power saving operation mode on which the energy management device or the environment information management device recommends, the method comprising:
 inputting an operation mode of the electric product on the user selection mode;
 displaying power consumption and a carbon dioxide emission amount according to the operation mode of the electric product being inputted on the first display;
 displaying estimated power consumption and estimated carbon dioxide emission amount depending according to the power saving operation mode on the second display;
 determining whether the power saving operation mode is selected or not;
 operating the electric product depending on the power saving operation mode if the power saving operation mode is selected, and operating the electric product depending on the operation mode of the electric product being inputted if the power saving operation mode is not selected;
 determining whether a target value of at least one of the power consumption or the carbon dioxide emission amount is inputted or not during operation depending on the operation mode of the electric product being inputted;
 determining whether the power consumption and the carbon dioxide emission amount being used, are above a threshold if the target value is inputted; and
 outputting a warning signal if the power consumption and the carbon dioxide emission amount being used are above a threshold.

2. The method according to claim 1, further comprising: determining whether a stop command is inputted after outputting the warning signal.

3. The method according to claim 2, further comprising:
 determining whether a stop command is inputted after outputting the warning signal; and
 displaying the power consumption and the carbon dioxide emission amount depending on the operation mode of the electric product being inputted.

4. The method according to claim 1, wherein the energy management device receives information for a general management of units through air channels.

5. The method according to claim 4, wherein the air channels comprise:
 a unit identifier, electricity charge information, a level information of the electricity charge, and error confirmation information.

6. The method according to claim 4, wherein the network system further comprises:
 a module for receiving broadcasting signals, which includes a digital multimedia broadcasting-terrestrial (DMB-T), a digital multimedia broadcasting-satellite (DMB-S), a media forward link only (mediaFLO), a digital video broadcast-handheld (DVB-H), or an integrated services digital broadcast-terrestrial (ISDB-T).

7. The method according to claim 4, wherein the network system further comprises:
 an energy supply part, which includes a distributed power source, and one of a plug in hybrid electric vehicle (PHEV), a solar cell, a load control device or an energy storage.

8. The method according to claim 4, wherein the metering device includes an electricity meter, a gas meter, and a water meter.

9. The network system according to claim 1, wherein whether the electric product is operated in the power-saving operation mode is decided according to whether the carbon amount or the carbon dioxide amount recognized by the environment information management device exceeds a set value.

10. The network system according to claim 9, wherein, when the carbon amount or the carbon dioxide amount recognized by the environment information management device exceeds the set value, the operation of the electric product is delayed or paused.

11. The network system according to claim 9, wherein the set value is a preset limitation carbon emission amount or limitation carbon dioxide emission amount.

* * * * *